US010296731B2

(12) United States Patent
Eun

(10) Patent No.: US 10,296,731 B2
(45) Date of Patent: May 21, 2019

(54) APPARATUS, INFORMATION PROCESSING METHOD, AND COMPUTER PROGRAM PRODUCT

(71) Applicant: Jongsook Eun, Tokyo (JP)

(72) Inventor: Jongsook Eun, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 163 days.

(21) Appl. No.: 15/065,418

(22) Filed: Mar. 9, 2016

(65) Prior Publication Data

US 2016/0275274 A1    Sep. 22, 2016

(30) Foreign Application Priority Data

Mar. 20, 2015  (JP) ................................. 2015-057299

(51) Int. Cl.
*G06F 7/04* (2006.01)
*G06F 21/31* (2013.01)
(Continued)

(52) U.S. Cl.
CPC .............. *G06F 21/31* (2013.01); *G06F 21/34* (2013.01); *G06F 21/45* (2013.01)

(58) Field of Classification Search
CPC ..... H04W 12/06; H04W 12/12; H04W 12/04; H04W 12/08; H04N 1/4413;
(Continued)

(56) References Cited

U.S. PATENT DOCUMENTS 7,201,659 B2 *  4/2007  Nakayama .............. A63F 13/12
                                                              463/40
2003/0105950 A1 *  6/2003  Hirano ................ G06F 21/6218
                                                              713/100
(Continued)

FOREIGN PATENT DOCUMENTS

CN    103714284 A    4/2014
CN    104021334 A    9/2014
(Continued)

OTHER PUBLICATIONS

Chinese Office Action dated Mar. 27, 2016 in Chinese Application No. 201610153597.2, with English translation, 17 pages.

*Primary Examiner* — Abiy Getachew
(74) *Attorney, Agent, or Firm* — Oblon, McClelland, Maier & Neustadt, L.L.P.

(57) ABSTRACT

An apparatus includes a determination unit, an authentication unit, and a using unit. The determination unit determines, from among application programs enabling user authentication using user identification information stored in a storage medium, an application program having application information containing information representing that the user authentication can be performed, as an application program to be used for the user authentication. Using the application program determined by the determination unit, the authentication unit determines whether input information that is input by a user matches the user identification information stored in the storage medium so as to perform the user authentication. When the input information and the user identification information match, the using unit uses the information stored in the storage medium.

13 Claims, 7 Drawing Sheets

(51) Int. Cl.
*G06F 21/34* (2013.01)
*G06F 21/45* (2013.01)

(58) Field of Classification Search
CPC ......... H04N 1/4433; H04N 2201/0094; H04N 1/00204; H04N 1/00413; H04N 1/32101; H04N 1/32771; H04N 21/431; H04N 2201/0055; A63F 13/12; G06F 21/31; G06F 21/34; G06F 21/45
See application file for complete search history.

(56) References Cited

U.S. PATENT DOCUMENTS

| | | |
|---|---|---|
| 2006/0171005 A1 | 8/2006 | Eun |
| 2007/0220269 A1 | 9/2007 | Suzuki |
| 2008/0235434 A1 | 9/2008 | Eun et al. |
| 2010/0149574 A1 | 6/2010 | Eun et al. |
| 2010/0205449 A1 | 8/2010 | Eun et al. |
| 2012/0011580 A1 | 1/2012 | Eun et al. |
| 2013/0321847 A1 | 12/2013 | Eun |
| 2014/0096191 A1* | 4/2014 | Saita ................. G06F 21/34 726/3 |
| 2014/0245414 A1 | 8/2014 | Eun |

FOREIGN PATENT DOCUMENTS

| | | |
|---|---|---|
| JP | 3739585 | 11/2005 |
| JP | 2009-069966 | 4/2009 |
| JP | 2010-186328 | 8/2010 |
| JP | 2014-194750 | 10/2014 |

\* cited by examiner

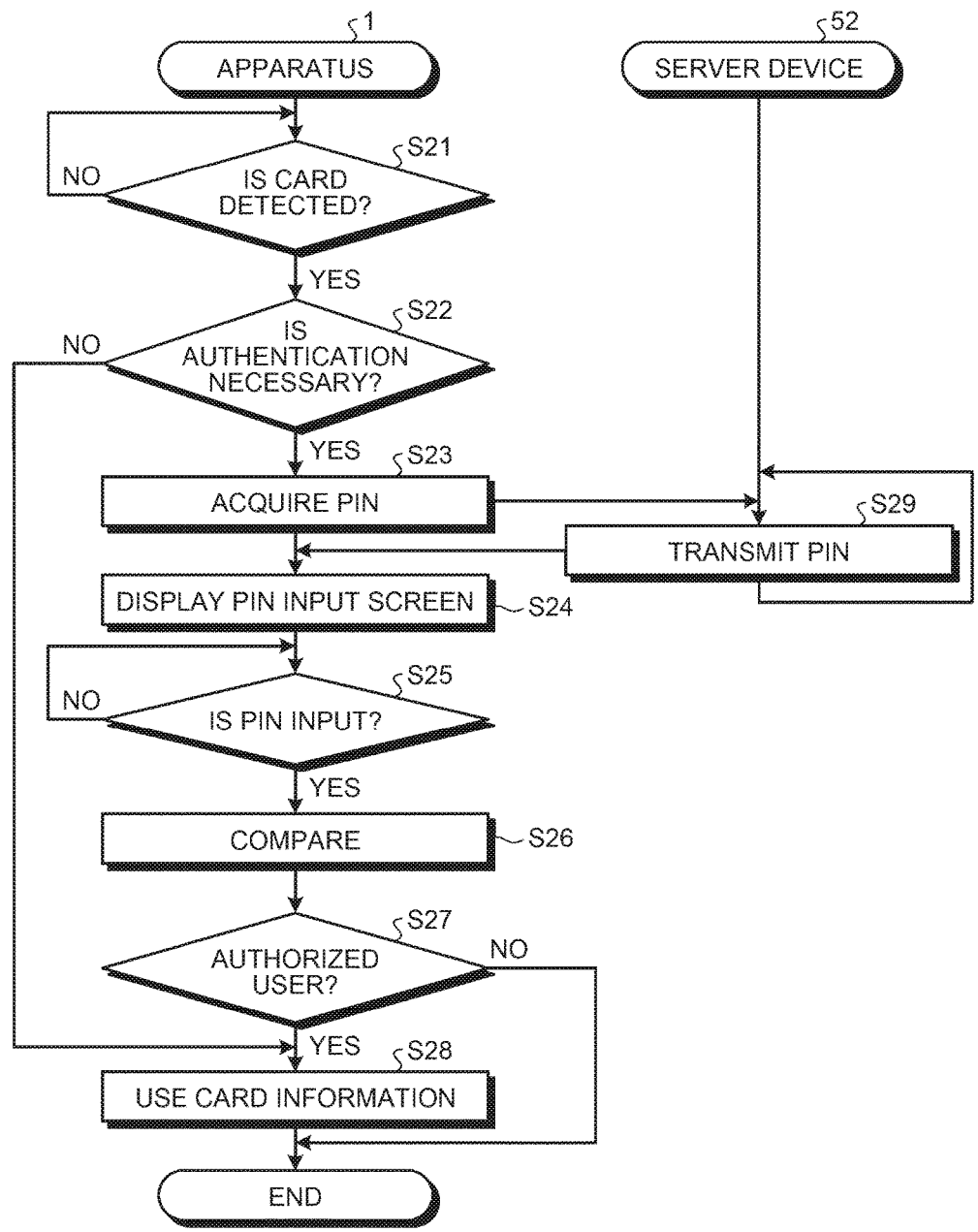

APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2015-057299 filed in Japan on Mar. 20, 2015.

BACKGROUND OF THE INVENTION

1. Field of the Invention

The present invention relates to an apparatus, an information processing method, and a computer program product.

2. Description of the Related Art

Image forming apparatuses that allow the use of their functions for only users who succeeded in login by using an IC card are known recently. This type of image forming apparatus displays a PIN input screen when an integrated circuit (IC) card from/to which data reading/writing is restricted by a personal identification number (PIN) is held over a card reader. Once a user inputs a PIN on the PIN input screen, the image forming apparatus compares the input PIN with the identification information of the IC card. Upon determining that the login succeeded, the image forming apparatus allows the use of, for example, a standard application program for a copy function, a facsimile function, etc., and a software development kit (SDK) application program for various SDK solutions.

Conventional image forming apparatuses, however, have a problem in that it is necessary for the manager to register and set an application with a "PIN authentication function" for identity verification of the user of the IC card, which is burdensome to the manager.

Therefore, there is a need for an apparatus, an information processing method, and a computer program product that enable reduction of work of the manager due to registration and setting of an application program that enables user authentication using user identification information that is stored in a storage medium.

SUMMARY OF THE INVENTION

It is an object of the present invention to at least partially solve the problems in the conventional technology.

According to an embodiment, an apparatus includes a determination unit, an authentication unit, and a using unit. The determination unit determines, from among application programs enabling user authentication using user identification information stored in a storage medium, an application program having application information containing information representing that the user authentication can be performed, as an application program to be used for the user authentication. Using the application program determined by the determination unit, the authentication unit determines whether input information that is input by a user matches the user identification information stored in the storage medium so as to perform the user authentication. When the input information and the user identification information match, the using unit uses the information stored in the storage medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart of a flow of a user authentication operation of the information processing system according to the second embodiment.

DETAILED DESCRIPTION OF THE PREFERRED EMBODIMENTS

In order to prevent unauthorized use of the IC card due to theft, etc., it is preferable to check the correctness of a PIN each time the IC card is used. However, repeated PIN input operations are significantly onerous and there is a risk that the convenience of the image forming apparatus lowers. In consideration of such a risk, the image forming apparatus is provided with a function of, after a PIN input or PIN authentication is performed on a login, not performing PIN authentication even when the IC card is held over the card reader for any number of times unless a logout operation is performed intentionally while the login keeps succeeding.

Japanese Laid-open Patent Publication No. 2010-186328 discloses an image forming apparatus aimed at improving the convenience of an IC card that requests an input of a PIN when the IC card is used. After login operation, once inputting a PIN is requested in accordance with the use of the IC card, the image forming apparatus acquires the identifier information from the IC card and compares the identifier information with the identifier information stored in a storage unit. Upon detecting matching between both pieces of identifier information, the image forming apparatus checks the authority of the user of the IC card by re-using the PIN corresponding to the identifier information stored in the storage unit. Accordingly, the image forming apparatus enables saving of a time for inputting a PIN again when inputting a PIN is requested in association with the use of the IC card after the login operation, which improves the convenience of the image forming apparatus.

With reference to the accompanying drawings, embodiments will be described in detail below.

First Embodiment

Figure 1:
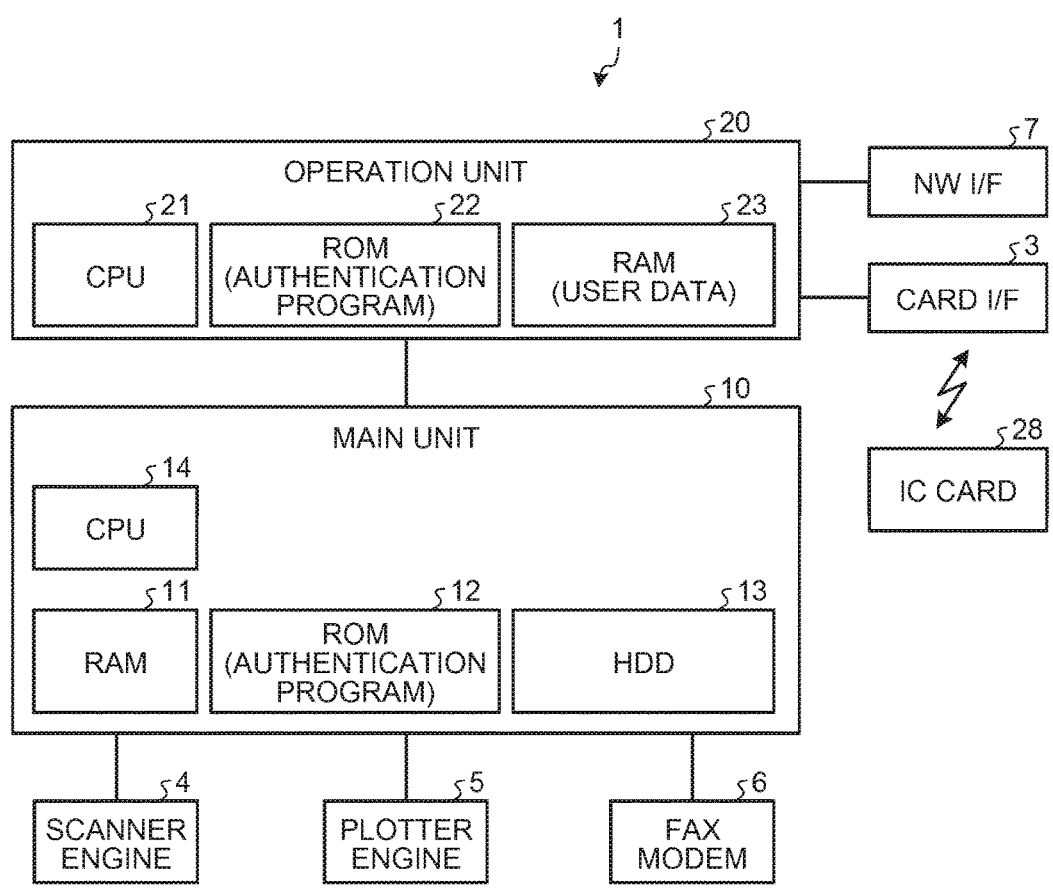
FIG. 1 is a hardware configuration diagram of an apparatus according to a first embodiment of the invention.

FIG. 1 is a hardware configuration diagram of an apparatus 1 of a first embodiment of the invention. The apparatus 1 may be an image forming device or a different type of electronic apparatus that performs user authentication. As shown in FIG. 1, the apparatus 1 includes a main unit 10 and an operation unit 20. A scanner engine 4, a plotter engine 5, and a facsimile modem device (FAX modem) 6 are connected to the main unit 10.

The scanner engine 4 optically reads an original placed on an original read table and generates image data. The plotter engine 5 prints an image by transferring a toner image formed on a photosensitive drum by using, for example, an electrophotographic processing system. The FAX modem 6 receives a facsimile image that is transmitted via a telephone line and transmits a facsimile image via the telephone line.

The main unit 10 includes a random access memory (RAM) 11 and a read only memory (ROM) 12. The main unit 10 further includes a hard disk drive (HDD) 13 and a central processing unit (CPU) 14. The RAM 11 serves as a so-called work area that is used for, for example, loading image data of an image to be printed. The RAM 11 is also used for a process of loading various application programs. The RAM 11 is also used as an area for temporarily storing data to be processed by using each of the application programs. The application programs are referred to as "applications" below.

The ROM 12 stores a program for an operation system (OS) that is executed when the apparatus 1 is started and various types of data. The ROM 12 also stores an authentication program for the main unit 10 that enables automatic registration of an application enabling user authentication using user identification information stored in a storage medium. The CPU 14 runs according to the OS that is stored in the ROM 12. The CPU 14 loads the authentication program stored in the ROM 12 into the RAM 11 and executes the program.

A card interface (I/F) 3 that performs non-contact wireless communications with an IC card 28 and a network interface (NW I/F) 7 are connected to the operation unit 20. The IC card 28 is exemplified as an exemplary medium that is a card used to identify the user. A medium called "identification card" or any other medium may be used.

The NW I/F 7 is an interface for connecting a server device, or a host computer device, to the apparatus 1 on a certain network. The apparatus 1 according to the first embodiment is capable of acquiring, for example, image data of an image to be printed from, for example, the host computer device to which the apparatus 1 is connected via the NW I/F 7. The card I/F 3 performs non-contact wireless communications with the IC card 28 of the user. The card I/F 3 reads/writes various types of card information, such as the identification number of the card (card ID) and the personal identification number (PIN) of the user, from/in the IC card 28.

The operation unit 20 includes a CPU 21, a ROM 22, and a RAM 23. The ROM 22 stores an authentication program for the operation unit 20. The authentication program enables automatic registration of an application enabling user authentication using the user identification information stored in the storage medium. The CPU 21 runs according to the OS that is stored in the ROM 22. The CPU 21 loads the authentication program stored in the ROM 22 into the RAM 11 and executes the program.

For the operation unit 20, an electronic device capable of independently completing information processing may be used. For example, an information processing terminal, such as a smartphone or a tablet terminal, may be used. In this case, the information processing terminal that is used as the operation unit 20 functions as the operation unit of the main unit 10.

More specifically, conventionally, instead of an operation panel that is fixed and set as an operation unit dedicated to the main unit 10, the information processing terminal used as the operation unit 20 is provided so that the information processing terminal is detachable/attachable from/to the main unit 10. In other words, while the information processing terminal used as the operation unit 20 is detachable (separable) at a certain position, such as the position at which the operation panel of the main unit 10 is disposed, the information processing terminal is set integrally with the main unit 10. Accordingly, the information processing terminal used as the operation unit 20 and the main unit 10 may be regarded as a single apparatus. Upon being detached from the main unit 10, the operation terminal serving as the operation unit 20 performs wireless communications, such as Wi-Fi (trademark), Bluetooth (trademark) or infrared communications, with the main unit 10 and functions as the operation unit of the main unit 10.

In the apparatus 1, in order to keep the functional independency, the OS of the main unit 10 and the OS of the operation unit 20 independently run on different operating systems. In other words, the main unit 10 and the operation unit 20 run independently on different operations systems. For example, Linux (trademark) may be used as the OS of the main unit 10 and Android (trademark) may be used as the OS of the operation unit 20.

By running the main unit 10 and the operation unit 20 by using the different operating systems, communications between the main unit 10 and the operation unit 20 are performed not as communications between processes in a common apparatus but as communications between different devices. The communications correspond to, for example, an operation (command communication) of the operation unit to transmit a received input (the detail of an instruction from the user) to the main unit 10 and an operation of the main unit 10 to notify the operation unit 20 of an event. Here, the operation unit 20 performs the command communication with the main unit 10 to enable the use of the functions of the main unit 10. The event of which the operation unit 20 is notified by the main unit 10 is on, for example, how much the operation of the main unit 10 proceeds and the details of the setting made by the main unit 10.

Figure 2:
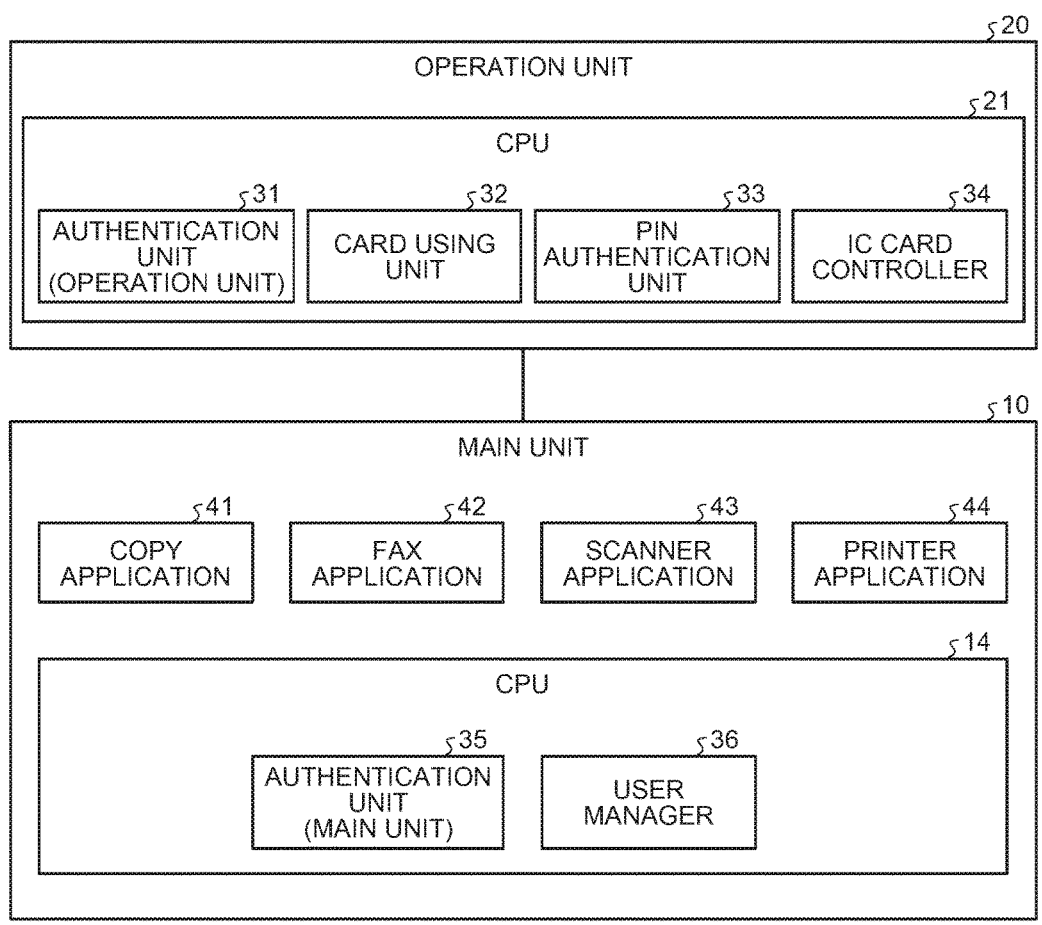
FIG. 2 is a functional block diagram of the apparatus according to the first embodiment.

FIG. 2 shows a functional block diagram of the main unit 10 and the operation unit 20. The CPU 14 of the main unit 10 implements various functions of an authentication unit (for the main unit) 35 and a user manager 36 by executing the authentication program for the main unit 10 that is stored in the ROM 12. The HDD 13 stores an address book in which user data for user authentication is registered. The user manager 36 manages registering/reading user data in/from the address book. When required by the operation unit 20, the authentication unit 35 performs user authentication by using the address book.

The address book may be stored in an authentication server that communicates with the apparatus 1 via the network (such as http/https). The address book may be stored in the application running on the apparatus 1. The address book may be stored in a storage medium, such as an HDD, and SD card (trademark), or a flash memory, that is connected to the apparatus 1.

A copy application 41 shown in FIG. 2 is an application program for the CPU 14 to implement a copy function. A FAX application 42 is an application program for the CPU 14 to implement a facsimile function. A scanner application 43 is an application program for the CPU 14 to implement a scanner function. A printer application 44 is an application program for the CPU 14 to implement a printer function.

In this example, the explanation will be given on the premise that the authentication unit 35 and the user manager 36 are implemented by using software. Alternatively, all or part of the authentication unit 35 and the user manager 36 may be implemented by using hardware, such as an integrated circuit (IC).

The authentication program for the main unit 10 may be provided by recording the authentication program in a computer-readable recording medium, such as a CD-ROM or a flexible disk (FD), in a file in an installable or executable form. Alternatively, the authentication program for the main unit 10 may be provided by recording the authentication program in a computer-readable recording medium, such as a CD-R, a digital versatile disk (DVD), a Blue-ray (trademark) disk or a semiconductor memory. Alternatively, the authentication program for the main unit 10 may be provided via a network, such as the Internet. The apparatus 1 may download the authentication program for the main unit 10 via the network, install the authentication program in the main unit 10 (or the operation unit 20), and execute the program. The authentication program for the main unit 10 may be provided by previously storing the authentication program in, for example, a ROM in the apparatus.

The CPU 21 of the operation unit 20 executes the authentication program for the operation unit 20 that is stored in the ROM 22 to function as an authentication unit (for the operation unit) 31, a card using unit 32, a PIN authentication unit 33, and an IC card controller 34. In order to increase the speed of a user authentication, the operation unit 20 previously acquires user data from the address book that is managed by the main unit 10 and stores the address book in the RAM 23. The authentication unit 31 performs user authentication by using the user data stored in the RAM 23. This enables completion of user authentication at a high speed. The card using unit 32 is an example of a using unit. The PIN authentication unit 33 is an example of a determination unit and an authentication unit.

When there is no user data to be subjected to user authentication in the RAM 23, the authentication unit 31 makes an inquiry on whether there is user data to be subjected to user authentication to the user manager 36 of the main unit 10. The user manager 36 searches the address book stored in the HDD 13 and sends, as a response, the search result to the authentication unit 31 of the operation unit 20. Upon receiving a search result representing that no user data to be subjected to user authentication is stored in the address book of the main unit 10, the authentication unit 31 determines that authentication failed.

The card using unit 32 provides a solution using the information that is read from the IC card 28. The PIN authentication unit 33 displays a PIN input screen on the operation unit 20, compares the PIN information that is input by the user with PIN information for accessing a security area (the area denoted with the reference numeral 50 in FIG. 5) in the IC card 28, and determines whether both pieces of PIN information match. The IC card controller 34 controls reading/writing information from/to the IC card 28 via the card I/F 3.

In this example, the explanation will be given on the premise that the authentication unit 31, the card using unit 32, the PIN authentication unit 33, and the IC card controller 34 are implemented by using software. Alternatively, all or part of those units may be implemented by using hardware, such as an semiconductor integrated circuit (IC).

The authentication program for the operation unit 20 may be provided by recording the authentication program in a computer-readable recording medium, such as a CD-ROM or a flexible disk (FD), in a file in an installable or executable form. Alternatively, the authentication program for the operation unit 20 may be provided by recording the authentication program in a computer-readable recording medium, such as a CD-R, a DVD, a Blue-ray (trademark) disk or a semiconductor memory. Alternatively, the authentication program for the operation unit 20 may be provided via a network, such as the Internet. The apparatus 1 may download the authentication program for the operation unit 20 via the network, install the authentication program into the operation unit 20 (or the main unit 10) and execute the program. The authentication program for the operation unit 20 may be provided by previously storing the authentication program in, for example, a ROM in the apparatus.

Figure 5:
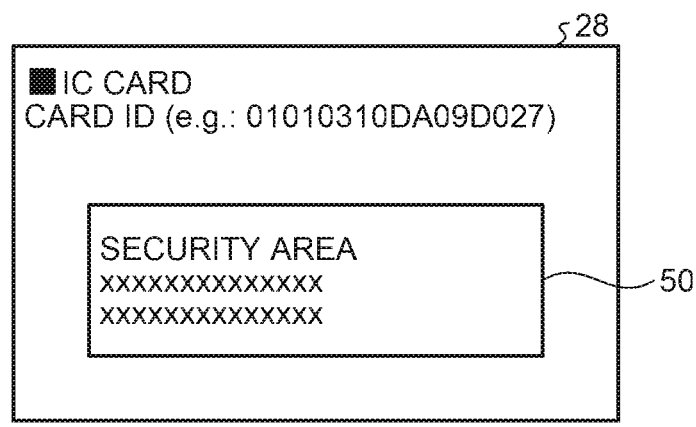
FIG. 5 is a diagram of an IC card that is used for the apparatus according to the first embodiment.

The card ID stored in the IC card 28 is, for example, a value, such as a serial number (e.g., the IDm (unique identification number) of FeliCa (trademark)) that can individually identify the IC card 28 as shown in FIG. 5.

In order for authentication of the IC card 28, the identification number of the IC card 28 and the user information, such as a login ID and a password, are associated with each other and stored in, for example, the HDD 13 of the main unit 10 and the RAM 23 of the operation unit 20. The security area 50 of the IC card 28 shown in FIG. 5 is a data area that is accessible only when a correct PIN is input. The data area corresponds to an area, on which a usage limitation is imposed, in the IC card 28.

Figure 3:
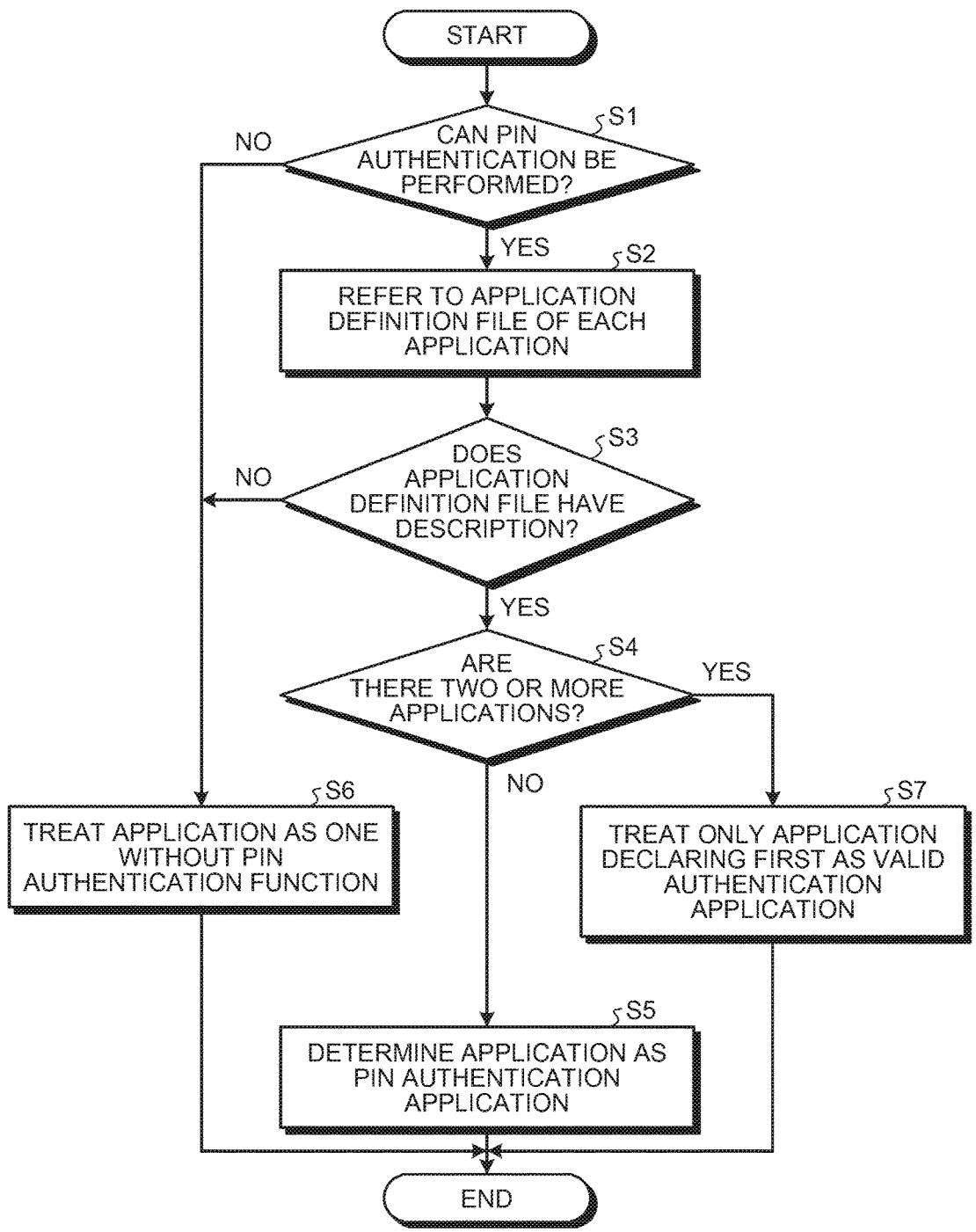
FIG. 3 is a flowchart of a flow of an operation of automatically registering an application enabling user authentication using the PIN of the apparatus according to the first embodiment.

The apparatus 1 according to the first embodiment automatically registers an application that enables user authentication using the PIN stored in the IC card 28. The flowchart of FIG. 3 shows a flow of an operation of automatically registering an application enabling user authentication using the PIN. At step S1, first, the authentication unit 31 of the operation unit 20 determines whether each application is an application enabling user authentication using a PIN. Upon determining that each application is not an application enabling user authentication using a PIN (NO at step S1), the authentication unit 31 advances the process to step S6 to determine that each application is treated as an application not enabling user authentication using a PIN and ends the process of the flowchart of FIG. 3. In this case, even when the IC card 28 for which PIN authentication operation is necessary is held over the card I/F 3, because the application does not enable the PIN authentication, accessing the security area 50 of the IC card 28 shown in FIG. 5 is prohibited. Accordingly, only the serial number (card ID) of the IC card 28 can be used.

Upon determining that each application is an application enabling user authentication using a PIN (YES at step S1), the authentication unit 31 advances the process to step S2 to refer to an application definition file of each application and advances the process to step S3. The application definition file is an example of application information. At step S3, the authentication unit 31 determines whether there is an application having a definition file in which "PIN authentication can be performed" is declared.

When there is no application having a definition file in which "PIN authentication can be performed" is declared (NO at step S3), the authentication unit 31 advances the process to step S6 to determine to treat the application as an application not enabling user authentication using a PIN and ends the process of the flowchart of FIG. 3. In this case, even when the IC card 28 for which the PIN authentication operation is necessary is held over the card I/F 3, because the application does not enable the PIN authentication, accessing the security area 50 of the IC card 28 shown in FIG. 5 is prohibited. Accordingly, only the serial number (the card ID) of the IC card 28 can be used.

When there is an application having a definition file in which "PIN authentication can be performed" is declared (YES at step S3), the authentication unit 31 advances the process to step S4. At step S4, the authentication unit 31 determines whether there are two or more applications having definition files in which "PIN authentication can be performed" is declared. When there is one application having a definition file in which "PIN authentication can be performed" is declared (NO at step S4), the authentication unit 31 determines the application as an application to be used for the PIN authentication on the IC card 28 at step S5 and ends the process of the flowchart of FIG. 3.

When there are two or more applications having definition files in which "PIN authentication can be performed" is declared (YES at step S4), the authentication unit 31 advances the process to step S7. Normally, it is highly unlikely that two or more applications each having the PIN authentication function are installed in one apparatus. However, when two or more applications each having the PIN authentication function are installed afterward, the authentication unit 31 determines the application first declaring that "PIN authentication can be performed" as an application to be used for the PIN authentication on the IC card 28 and ends the process of the flowchart of FIG. 3. Even when another application declaring that "PIN authentication can be performed" is added afterward, the authentication unit 31 treats the other application as an application declaring that "PIN authentication cannot be performed".

In this manner, the apparatus 1 according to the first embodiment is capable of automatically registering an application having the "PIN authentication function". For this reason, the manager does not have to manually register or set an application having the "PIN authentication function", which reduces the work of the manager.

Figure 4:
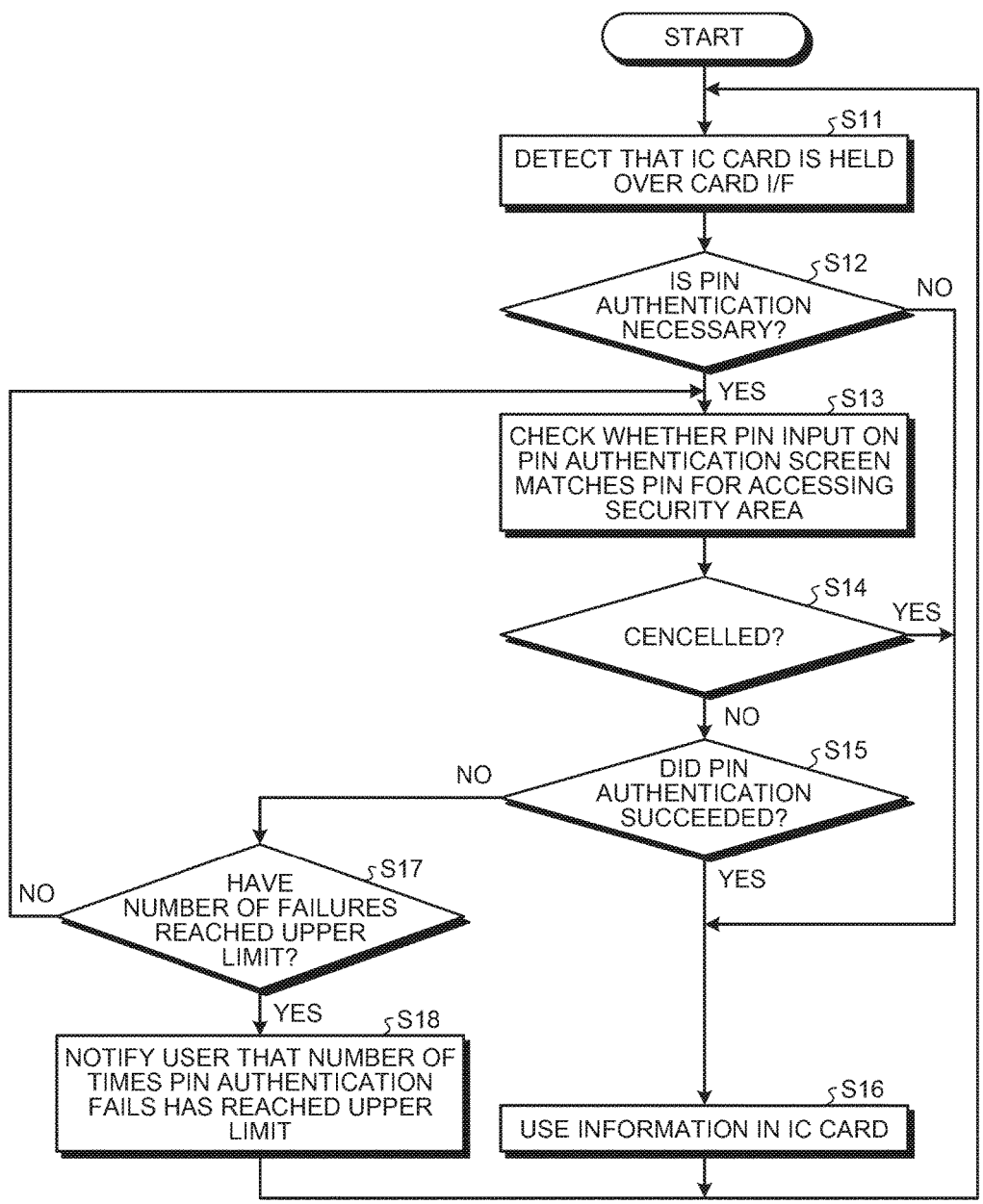
FIG. 4 is a flowchart of a flow of a user authentication operation of the apparatus according to the first embodiment.

The flowchart shown in FIG. 4 shows the flow of a process performed via PIN authentication on the IC card 28 until the information in the IC card 28 is used. At step S11, the IC card controller 34 of the operation unit 20 detects that the IC card 28 is held over the card I/F 3. Accordingly, the process proceeds to stop S12. At step S12, the PIN authentication unit 33 determines whether the IC card 28 held over the card I/F 3 is the IC card 28 for which PIN authentication is necessary. The PIN authentication unit 33 is an application that is determined to be used for the PIN authentication on the IC card 28 as described above. When the PIN authentication unit 33 determines that the IC card 28 is the IC card 28 for which PIN authentication is unnecessary (NO at step S12), the card using unit 32 uses the information in the IC card 28.

When the PIN authentication unit 33 determines that the IC card 28 held over the card I/F 3 is the IC card 28 for which PIN authentication is necessary (YES at step S12), the process proceeds to step S13. At step S13, the PIN authentication unit 33 displays a PIN authentication screen on the display unit. The user inputs a PIN on the PIN authentication screen. The PIN authentication unit 33 compares the PIN that is input by the user and the PIN for accessing the security area 50 of the IC card 28 shown in FIG. 5.

At step S14, the PIN authentication unit 33 determines whether the user performs an operation to cancel using the IC card 28. When a cancel operation is detected (YES at step S14), the process proceeds to step S16 where the card using unit 32 uses the information in the IC card 28 that is stored in an area other than the security area 50.

When no cancel operation is detected (NO at step S14), the process proceeds to step S15 where the PIN authentication unit 33 determines whether the PIN authentication succeeded. Upon determining that the PIN authentication failed (NO at step S15), the PIN authentication unit 33 determines whether the number of times PIN authentication failed has reached an upper limit, for example, for successive three times (step S17). When the number of times PIN authentication failed has not reached the upper limit (NO at step S17), the process at steps S13 to S15 is executed repeatedly.

When the number of times PIN authentication failed has reached the upper limit (YES at step S17), the process proceeds to step S18 where the PIN authentication unit 33 displays an error message on, for example, the display unit to notify the user that the number of times PIN authentication failed has reached the upper limit.

When it is determined at step S15 that the PIN authentication succeeded (YES at step S15), the process proceeds to step S16. In this case, because the PIN authentication succeeded, the card using unit 32 uses the information stored in the security area 50 in the IC card 28.

As it is clear from the descriptions given above, the apparatus 1 according to the first embodiment automatically registers an application enabling user authentication using a PIN (see FIG. 3) and, when the IC card 28 is held over the card I/F 3, performs PIN authentication by using the registered application for PIN authentication, so that the information in the IC card 28 can be used. Accordingly, the manager does not have to manually register and set an application enabling user authentication using a PIN, which reduces the work of the manager.

Second Embodiment

An information processing system according to a second embodiment of the present invention will be described here. In the case of the apparatus according to the first embodiment, a PIN used for authentication of a user is read from the IC card 28. The information processing system according to the second embodiment acquires a PIN from a server device on a network. In the descriptions of the information processing system according to the second embodiment, the components performing the same operations as those of the first embodiment are denoted with the same reference numerals as those of the first embodiment and detailed descriptions of the components will be omitted.

Figure 6:
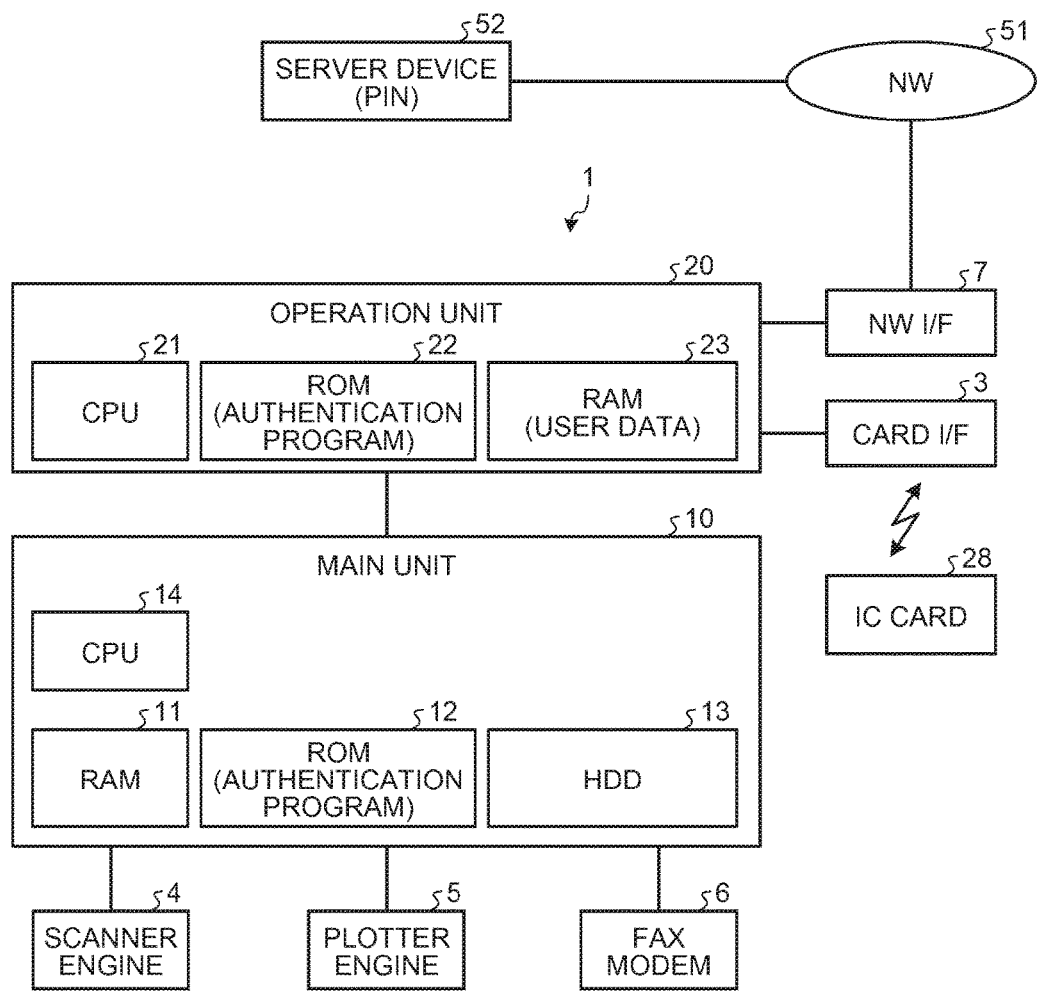
FIG. 6 is a hardware configuration diagram of an information processing system according to a second embodiment of the invention.

FIG. 6 shows a hardware configuration of the information processing system according to the second embodiment. As shown in FIG. 6, the information processing system according to the second embodiment includes a server device 52 that is connected to the apparatus 1 according to the first embodiment via a network (NW) 51. The server device 52 is connected to the apparatus 1 via the network 51 and a network interface (NW I/F).

FIG. 7 is a flowchart of a flow of operations of acquiring a PIN from the server device 52 to perform user authentication and using the information in the IC card 28, which are operations performed by the apparatus 1 of the information processing system according to the second embodiment. First, at step S21, the IC card controller 34 determines whether the IC card 28 is detected at the card I/F 3. When the IC card controller 34 detects that the IC card 28 is detected at the card I/F 3, the process proceeds to step S22. At step S22, the PIN authentication unit 33 determines whether the IC card 28 is an IC card for which user authentication is necessary. When the IC card 28 is an IC card for which user authentication is unnecessary, the process proceeds to step S28 where the card using unit 32 uses the information in the IC card 28.

When the PIN authentication unit 33 determines that user authentication is necessary for the IC card 28 and accordingly the process proceeds to step S23, the IC card controller 34 acquires the card ID from the IC card 28 via the card I/F 3. At step S23, the PIN authentication unit 33 transmits the acquired card ID to the server device 52 via the NW I/F 7 and requests the server device 52 to transmit a PIN.

The server device 52 stores the card ID of each IC card 28 and the PIN corresponding to the IC card 28 in a storage unit (not shown) in association with each other. The server device 52 searches for the PIN corresponding to the card ID received from the apparatus 1. At step S29, the server device 52 transmits the retrieved PIN to the apparatus 1 via the network 51. The PIN authentication unit 33 of the apparatus 1 acquires the PIN that is transmitted from the server device 52 via the NW I/F 7 and temporarily stores the PIN in a storage unit, such as the RAM 23.

Upon acquiring the PIN from the server device 52 as described above, the PIN authentication unit 33 requests the user to input a PIN at step S24 and step S25. Once the user inputs a PIN, at step S26, the PIN authentication unit 33 compares the PIN acquired from the server device 52 and stored in the storage unit with the PIN that is input by the user. On detecting that the PINs match at step S27, the PIN authentication unit 33 confirms that the user is authorized and, at step S28, uses the information stored in the security area 50 of the IC card 28 and ends the process of the flowchart of FIG. 7.

As it is clear from the description given above, the information processing system according to the second embodiment acquires the PIN from the server device 52 that is in a location physically distant from the apparatus 1 to perform user authentication. This enables user authentication using the PIN that is safely managed by the server device 52. Accordingly, the security of the information processing system can be improved and the same effects as those of the apparatus 1 according to the first embodiment can be obtained.

According to the embodiment, there is an effect of reducing the work of the manager due to registration and setting of an application program that enables user authentication using user identification information that is stored in a storage medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising:
circuitry configured to
identify, from among application programs including application programs having a user authentication function using user identification information and application programs not having the user authentication function and using the user identification information, an application program having application information containing information representing that the user authentication can be performed, as an application program to be used for the user authentication, the user identification information being information used to access additional information stored in the storage medium;
register the identified application program;
determine whether the detected storage medium is a storage medium for which the user authentication using the user identification information is necessary;
determine, using the registered application program, whether input information that is input by a user matches the user identification information stored in the storage medium so as to perform the user authentication;
access the additional information stored in the storage medium in response to a match between the input information and the user identification information; and
in response to determining that the detected storage medium is the storage medium for which the user authentication is necessary, the registered application program controls a display to display a screen on which the registered application program inputs the user identification information.

2. The apparatus according to claim 1, wherein, upon detecting two or more application programs each having application information containing information representing that the user authentication can be performed, the circuitry determines the application program that is detected first as the application program to be registered and used for the user authentication.

3. The apparatus according to claim 1, wherein
the additional information is stored in an area, on which a usage limitation is imposed, in the storage medium, and
when there is no application program enabling the user authentication, or when there is no application program having the application information, the circuitry uses information that is stored in an area other than the area on which the usage limitation is imposed.

4. The apparatus according to claim 1, wherein
the user identification information is stored in a server device that is connected to the apparatus via a network, and
the circuitry performs the user authentication by using the user identification information that is acquired from the server device.

5. An information processing method comprising:
identifying, with circuitry, from among application programs including application programs having a user authentication function using user identification information and application programs not having the user authentication function and using the user identification information, an application program having application information containing information representing that the user authentication can be performed, as an application program to be used for the user authentication, the user identification information being information used to access additional information stored in the storage medium;
registering, with the circuitry, the identified application program;
determining whether the detected storage medium is a storage medium for which the user authentication using the user identification information is necessary;
determining, with the circuitry, using the registered application program, whether input information that is input by a user matches the user identification information stored in the storage medium so as to perform the user authentication;

accessing, with the circuitry, the additional information in response to a match between the input information and the user identification information; and in response to determining that the detected storage medium is the storage medium for which the user authentication is necessary, displaying a screen on which the registered application program inputs the user identification information.

6. The information processing method according to claim 5, further comprising:

upon detecting two or more application programs each having application information containing information representing that the user authentication can be performed, determining the application program that is detected first as the application program to be registered and used for the user authentication.

7. The information processing method according to claim 5, wherein the additional information is stored in an area, on which a usage limitation is imposed, in the storage medium, and the accessing includes, in response to there being no application program enabling the user authentication, or in response to there being no application program having the application information, accessing information that is stored in an area other than the area on which the usage limitation is imposed.

8. The information processing method according to claim 5, wherein the user identification information is stored in a server device that is connected to an apparatus including the circuitry, via a network, and the performing includes performing the user authentication by using the user identification information that is acquired from the server device.

9. A non-transitory computer readable medium having instructions stored therein that, when executed by processing circuitry, cause the processing circuitry to perform a method comprising:

identifying from among application programs including application programs having a user authentication function using user identification information and application programs not having the user authentication function and using the user identification information, an application program having application information containing information representing that the user authentication can be performed, as an application program to be used for the user authentication, the user identification information being information used to access additional information stored in the storage medium;

registering the identified application program;

determining whether the detected storage medium is a storage medium for which the user authentication using the user identification information is necessary;

determining, using the registered application program, whether input information that is input by a user matches the user identification information stored in the storage medium so as to perform the user authentication;

accessing the additional information in response to a match between the input information and the user identification information; and in response to determining that the detected storage medium is the storage medium for which the user authentication is necessary, displaying a screen on which the registered application program inputs the user identification information.

10. The non-transitory computer readable medium according to claim 9, the further comprising: upon detecting two or more application programs each having application information containing information representing that the user authentication can be performed, determining the application program that is detected first as the application program to be registered and used for the user authentication.

11. The non-transitory computer readable medium according to claim 9, wherein the additional information is stored in an area, on which a usage limitation is imposed, in the storage medium, and the accessing includes, in response to there being no application program enabling the user authentication, or in response to there being no application program having the application information accessing information that is stored in an area other than the area on which the usage limitation is imposed.

12. The non-transitory computer readable medium according to claim 9, wherein the user identification information is stored in a server device that is connected to the processing circuitry via a network, and the authentication unit performs the user authentication by using the user identification information that is acquired from the server device.

13. The apparatus according to claim 1, wherein the additional information is stored in an area, on which a usage limitation is imposed, in the storage medium, and the circuitry is further configured to use information that is stored in an area other than the area on which the usage limitation is imposed in response to no identification of an application program enabling the user authentication.

* * * * *